United States Patent [19]
Kawasaki et al.

[11] Patent Number: 5,892,989
[45] Date of Patent: Apr. 6, 1999

[54] ROTATION DEVICE AND APPARATUS EQUIPPED WITH ROTATION DEVICE

[75] Inventors: Toyotoshi Kawasaki, Kawachinagano; Hiroyuki Ogura, Nishinomiya, both of Japan

[73] Assignee: Minolta Co., Ltd., Osaka, Japan

[21] Appl. No.: 864,683

[22] Filed: May 28, 1997

[30] Foreign Application Priority Data

May 30, 1996 [JP] Japan ................................. 8-136267

[51] Int. Cl.⁶ ............................. G03B 3/10; G01D 5/34
[52] U.S. Cl. ...................... 396/87; 396/133; 310/68 B; 250/231.14
[58] Field of Search .................. 396/87, 133; 310/68 B; 250/231.14

[56] References Cited

U.S. PATENT DOCUMENTS 4,751,888  6/1988  Hanus ........................... 250/231.14 X

FOREIGN PATENT DOCUMENTS 59-26709   2/1984  Japan .
61-133926  6/1986  Japan .

*Primary Examiner*—W. B. Perkey
*Attorney, Agent, or Firm*—Burns, Doane, Swecker & Mathis, LLP

[57] ABSTRACT

A skirt located on a worm is inserted in a C-shaped hole of a photo-interrupter blade wheel, and a motor shaft passes thought the center of each of said members. The rotation of the worm is transmitted to photo-interrupter blades with a predescribed angle of play due to the relative dimensions of a notch formed on the skirt and the C-shaped hole.

21 Claims, 14 Drawing Sheets

ROTATION DEVICE AND APPARATUS EQUIPPED WITH ROTATION DEVICE

BACKGROUND OF THE INVENTION

1. Field of the Invention

The present invention pertains to a device capable of preventing counting errors with regard to the number of rotations of a driving device or a driving source used to drive a movable member such as a photo-taking optical system or X-Y table, as well as to an apparatus equipped with said device.

2. Description of the Prior Art

In connection with an apparatus having a movable member, i.e., in connection with the focusing or zooming of the photo-taking optical system in a camera lens mount, for example, when the lens units are driven, the number of rotations of the drive motor, which is the drive source for said lens units, is conventionally counted by means of pulse counting using a construction in which blades that rotate together with the drive motor pass through a gap of a photo-interrupter. By means of this counting, the amount of drive performed by the drive motor may be confirmed and the lens units may be driven to their desired positions.

However, in the construction described above, there is a possibility of an error occurring in the counting of the number of rotations of the drive motor when reactive reverse rotation occurs due to the elasticity, etc., of the components comprising the reduction mechanism located in the path used to transmit the driving force of the drive motor to a driven member.

SUMMARY OF THE INVENTION

The object of the present invention is to provide a device that absorbs said reactive reverse rotation and accurately counts the number of rotations, or an apparatus that can accurately drive the movable member by means of said device.

In order to attain the object described above, one aspect of the present invention comprises a rotatable member to whose rotational shaft is attached a rotational force outputting mechanism and photo-interrupter blades that act on a photosensor to detect the number of rotations, wherein said photo-interrupter blades are placed loosely around said rotational shaft such that it may rotate via engagement with an interlocking portion attached to said rotational shaft, said engagement taking place at one end of a prescribed range of play.

It is also preferred that the construction be such that said photo-interrupter blades are slidingly supported by a fixed member.

It is further preferred that the construction be such that said interlocking portion is frictionally connected to said rotational shaft.

Using the construction described above in which engagement occurs at one end of a prescribed range of play, the reactive reverse rotation that occurs when the rotatable member stops rotating may be absorbed, and counting errors with regard to the number of rotations of said rotatable member may be prevented.

In addition, using the construction in which the photo-interrupter blades are slidingly supported by a fixed member, the photo-interrupter blades may be prevented from wobbling.

Further, by frictionally supporting the interlocking portion to the rotational shaft, when excess torque occurs as a result of the application of some external force to the interlocking portion, excessive heating and burning of the rotatable member may be prevented by frictionally sliding around the rotational shaft in its direction of rotation.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
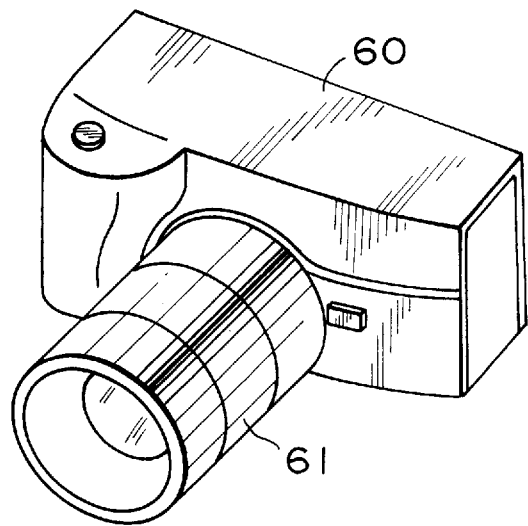
FIG. 1 is a perspective view showing the external view of a camera to which a photo-taking optical device, a first embodiment of the present invention, is attached.
Figure 2:
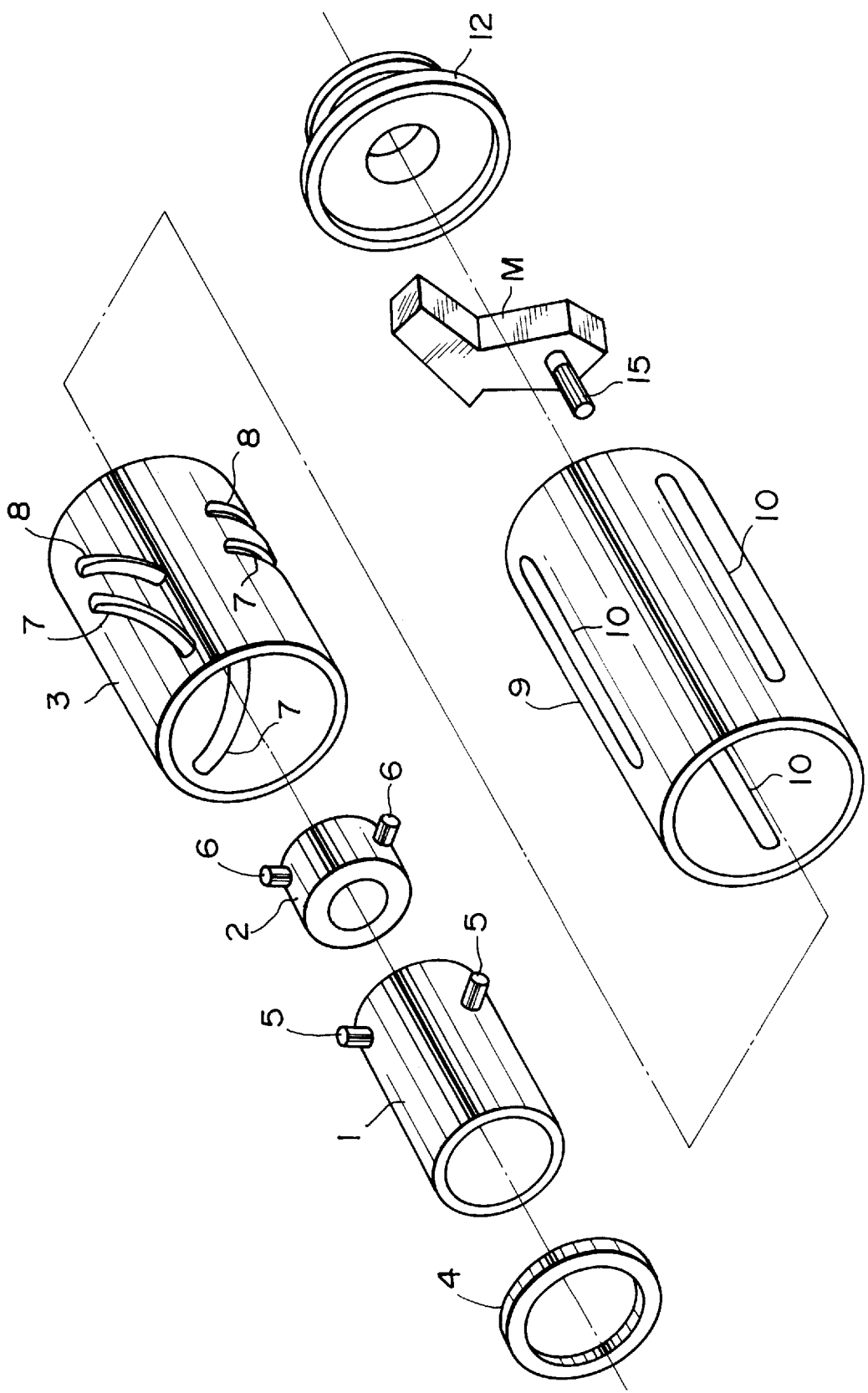
FIG. 2 is a perspective view showing the main components comprising the photo-taking optical device, of a first embodiment of the present invention, in a disassembled fashion.

Embodiments of the present invention are explained below with reference to the drawings. FIG. 1 is a perspective view showing the external view of a camera in which interchangeable lens (photo-taking optical device) 61, a first embodiment of the present invention, is attached to camera body 60. FIG. 2 is a simplified perspective view showing the main components of the photo-taking optical device, the embodiment described above, disassembled and arranged along the optical axis. In this drawing, 1 is a first movable frame that is located in the front part of the photo-taking optical device, and 2 is a second movable frame. Lens units L1 and L2 (not shown in the drawing) are held inside said frames, respectively. A cam barrel 3 is illustrated. The first and the second movable frames 1 and 2 are inserted in the cam barrel 3, and pins 5 and 6 that are respectively located on said frames pass through cam grooves 7 and 8, respectively, that are located on the cam barrel 3 in a spiral fashion.

Numeral 9 denotes a fixed barrel, and 10 are cam grooves that are located on the fixed barrel 9 in a linear fashion. The cam barrel 3 is inserted in this fixed barrel 9, and the pins 5 and 6 that pass through the cam grooves 7 and 8 further pass through the cam grooves 10. Numeral 4 denotes a holding ring, M is a motor unit that has a built-in motor and from which protrudes driving gear 15 that rotates by means of said motor, and 12 is a cover that covers the rear end of the photo-taking optical device. In addition, an outer member that covers the cam grooves 10 is located around the fixed barrel 9, but this is omitted in the drawing.

Figure 3:
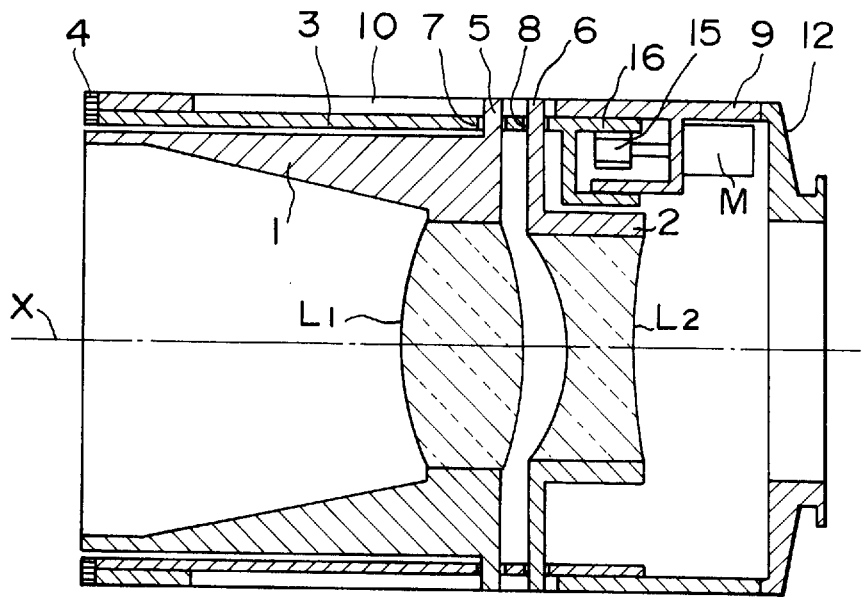
FIG. 3 is a simplified vertical cross-sectional view showing the photo-taking optical system when it is assembled.
Figure 4:
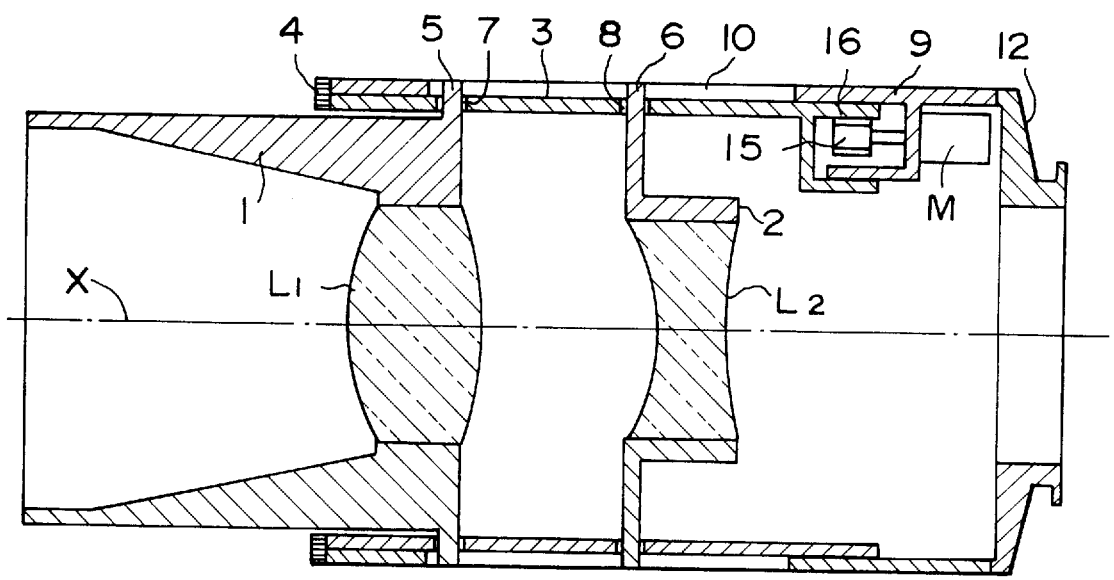
FIG. 4 is a simplified vertical cross-sectional view showing the photo-taking optical system when the lens units are driven.

FIG. 3 is a simplified vertical cross-sectional view showing the photo-taking optical device when it is assembled. FIG. 4 is a simplified vertical cross-sectional view showing the photo-taking optical device when the lens units are driven. In FIG. 3, when the driving gear 15 is driven by the motor unit M, an inner gear 16 that is located on part of the inner surface of the cam barrel 3 becomes engaged with the driving gear 15 and is driven such that the cam barrel 3 rotates with optical axis X as the rotational axis.

When the cam barrel 3 rotates, the cam grooves 7 and 8 that are located on the cam barrel 3 in a spiral fashion respectively push the pins 5 and 6 that are located on the first and the second movable frames 1 and 2, and the pins 5 and 6 move along the cam grooves 10 that are located on the fixed barrel 9 in a linear fashion. Therefore, the first and the second movable frames 1 and 2 are driven along the optical axis, as shown in FIG. 4, as are lens units L1 and L2. Here, since the amounts of movement of the first movable frame 1 and of the second movable frame 2 differ due to the difference in configuration between the cam grooves 7 and 8, the distance between the first movable frame 1 and the second movable frame 2 increases.

Figure 5:
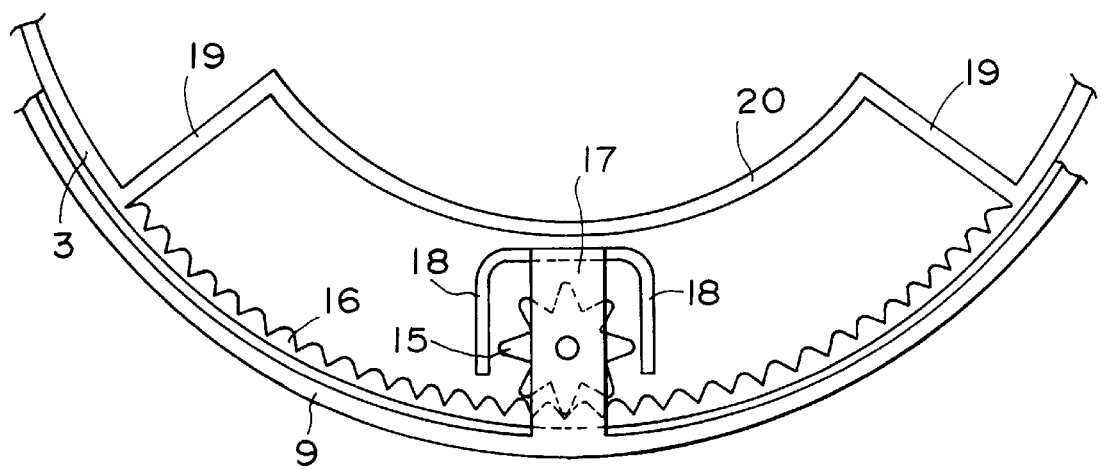
FIG. 5 is a simplified drawing showing the driving gear and the surrounding area as seen along the optical axis.

FIG. 5 is a simplified drawing showing the driving gear 15 and the surrounding area as seen along the optical axis. A cover 18 that is located on a bearing 17 that extends from the fixed barrel 9 has a function to stop the operation of the inner gear 16 and the rotation of the cam barrel 3 by coming into contact with one of stoppers 19 that are located on either end of the inner gear 16, as well as a function to protect the driving gear 15. Numeral 20 denotes a sliding member that is mounted to the cam barrel 3 as a single integrated unit bridging stoppers 19. It comes into contact with the bearing 17 when the driving gear 15 is lifted, and prevents the driving gear 15 from escaping. The sliding member 20 has an arched configuration that curves in a concentric fashion relative to the fixed barrel 9 in order to maintain its closeness to the bearing 17 when the cam barrel 3 rotates. While the sliding member 20 is close to the bearing 17 in FIG. 5, it is also acceptable if the sliding member 20 is in contact with the bearing 17 at all times.

Figure 6:
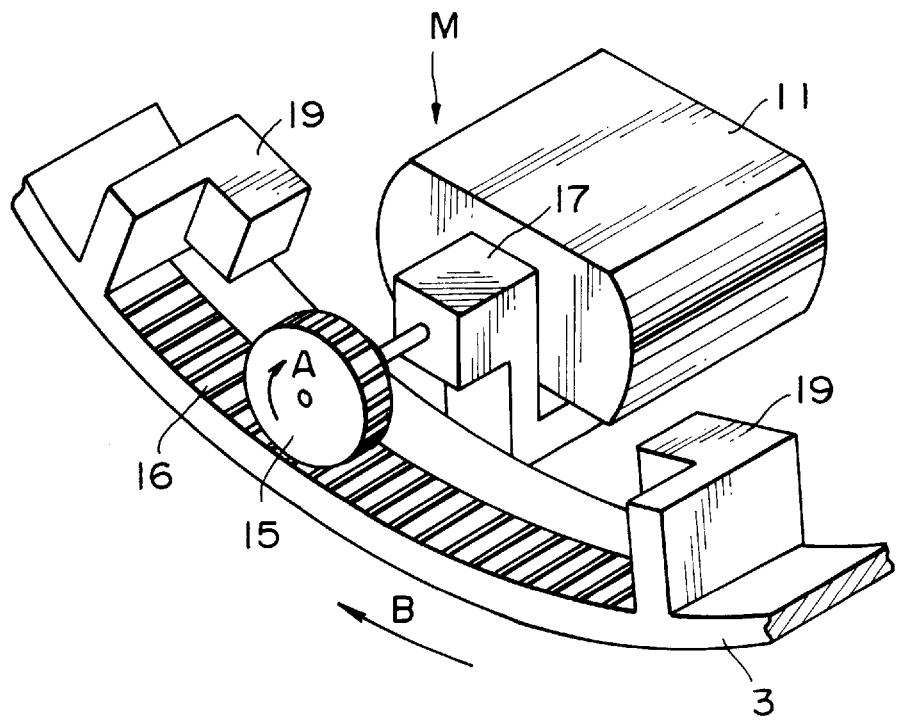
FIG. 6 is a simplified perspective view showing a situation in which stoppers that come into contact with the bearing are used.
Figure 7:
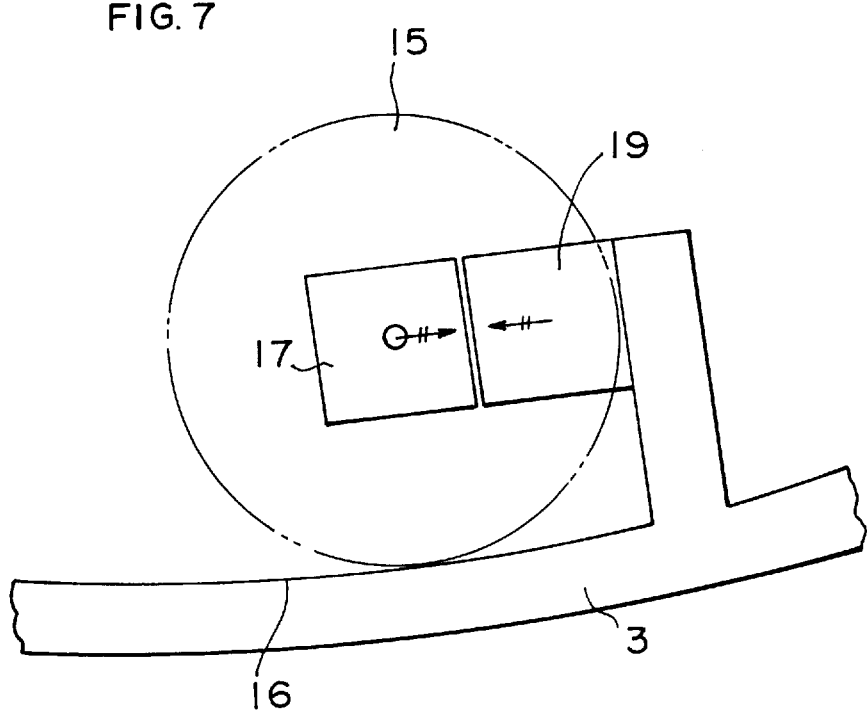
FIG. 7 is a simplified drawing showing a situation in which one of the stoppers is in contact with the bearing.

FIG. 6 is a simplified perspective view showing a situation in which the stoppers 19 that come into contact with the bearing 17 are located at either end of the inner gear 16. In this drawing, when the driving gear 15 is driven by a motor 11 contained in the motor unit M and rotates in the direction indicated by arrow A, the inner gear 16 becomes engaged with the driving gear 15 and is driven in the direction indicated by arrow B. When it is driven to the end, the stopper 19 comes into contact with the bearing 17, as shown in FIG. 7, and the offsetting forces indicated by the arrows operate to stop the movement of the inner gear 16. At this moment, since the bearing 17 is not swung to the right in the drawing, a situation in which the gears disengage and rotate freely, which could arise as a result of said swinging of the bearing 17, does not occur.

This is also true when the driving gear 15 rotates in the opposite direction and the inner gear 16 moves in the direction opposite from that indicated by arrow B and comes into contact with the stopper 19 at the other end. When the stopper 19 comes into contact with the bearing 17 and the inner gear 16 stops, a force to stop the driving gear 15 operates to bring the driving gear 15 to a halt. When a detector (not shown in the drawing) detects that the driving gear 15 has stopped, motor drive signals are no longer provided, and the driving of the motor 11 (and the driving gear 15) stops.

Figure 8:
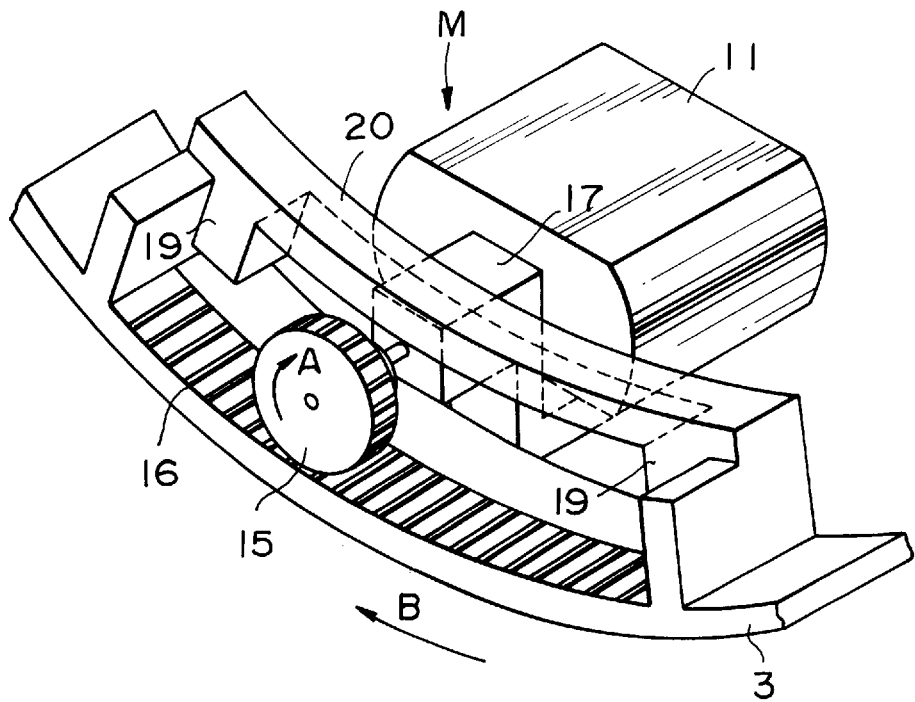
FIG. 8 is a simplified perspective view showing a situation in which a sliding member that comes close to or in contact with the bearing is used.
Figure 9:
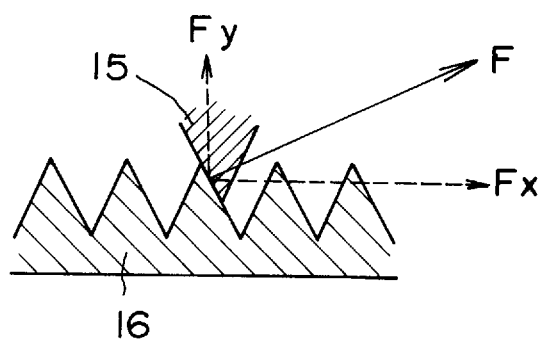
FIG. 9 is a drawing explaining the forces received by the driving gear.

FIG. 8 shows a case in which the sliding member 20 is also used. In this case as well, when the driving gear 15 is driven by the motor 11 and rotates in the direction indicated by arrow A, the inner gear 16 becomes engaged with the driving gear 15 and is driven in the direction indicated by arrow B. When this takes place, the bearing 17 and the sliding member 20 are close to or in sliding contact with each other. When being driven, the driving gear 15 receives reactive force F from the inner gear 16, as shown in FIG. 9. The component forces Fy and Fx of said force F are expressed as follows: Fy is a force in the direction in which the disengagement of the gears occurs and Fx is a reaction to the force used to drive the inner gear 16 along the direction of its length. Normally, component forces Fy and Fx are absorbed by the bearing 17.

Figure 10:
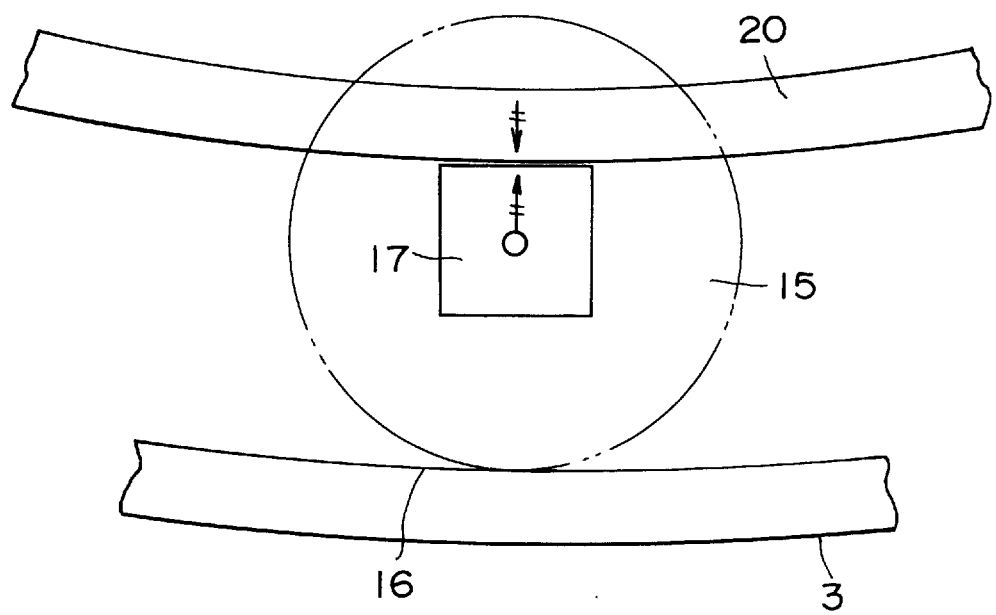
FIG. 10 is a simplified drawing showing a situation in which the sliding member is in contact with the bearing.

Here, if the inner gear 16 is forcibly stopped, by means of, for example the camera user applying some external force, because a driving force is still at work on the driving gear 15, force F increases, which in turn increases component force Fy as well. Consequently, it becomes impossible for the bearing 17 only to absorb component force Fy, and there is a possibility that the gears will become disengaged and rotate freely. However, because the sliding member 20 exists and comes into contact with the bearing 17, the forces indicated by the arrows operate as shown in FIG. 10, offsetting each other, and as a result component force Fy is absorbed and free gear rotation may be prevented.

In this example, when the inner gear 16 is driven to the end, component force Fx may be absorbed by having the inner gear 16 come into contact with an external stopper instead of having the bearing 17 come into contact with the stopper 19, because there is no possibility that free gear rotation will occur at the end as long as the sliding member 20 exists. Using the free gear rotation prevention mechanism described above, the photo-taking optical system may be reliably driven.

Figure 13:
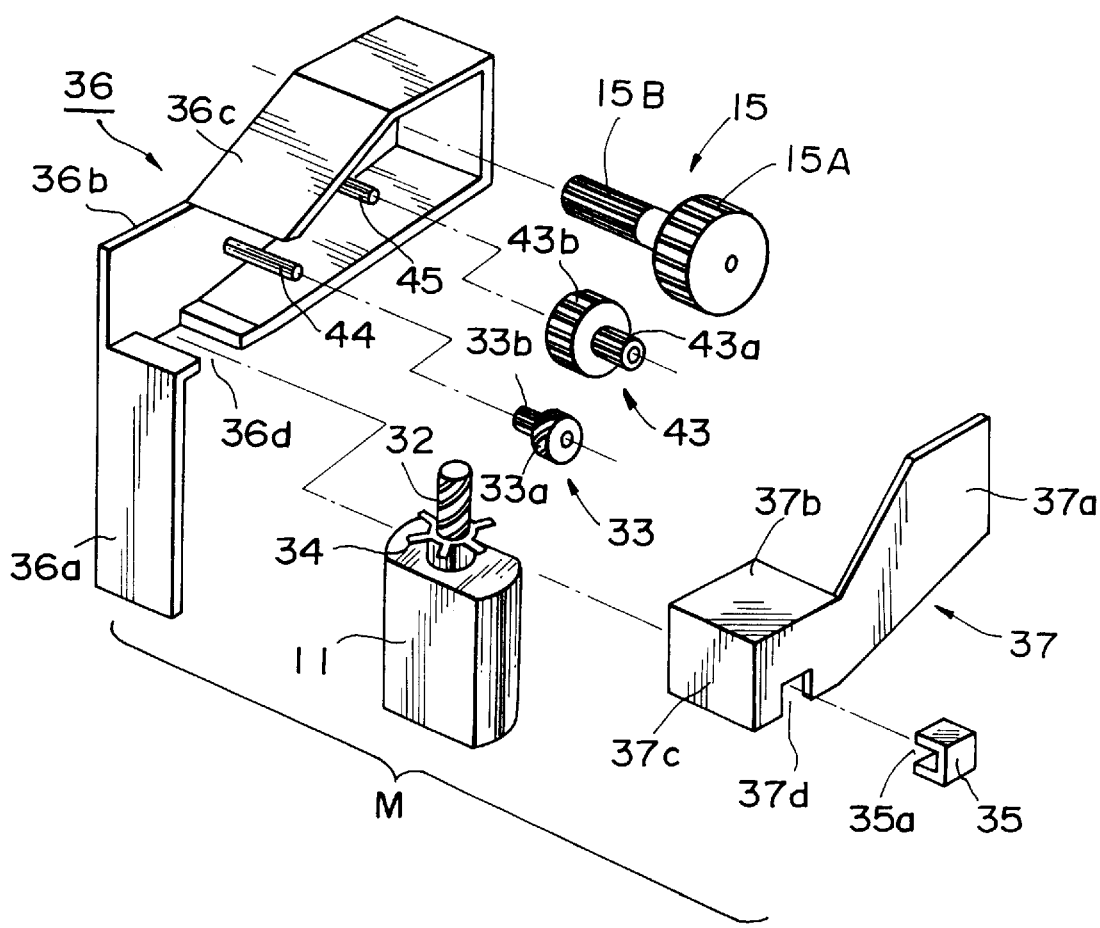
FIG. 13 is a perspective view showing a motor unit in a disassembled fashion.

FIG. 13 is a detailed perspective view showing the motor unit M in the first embodiment described above in a disassembled fashion. Numeral 36 denotes a cabinet that supports and houses the motor 11, gears, etc., and has an overall L-shaped configuration. The motor 11 is attached to a plate 36a, which forms one of the sides of the L-shaped configuration. Shafts 44 and 45 that rotatably support reduction gears 33 and 43, respectively, are attached to the other plate 36*b*. The plate 36*b* also has a hole (not shown in the drawing) throughwhich passes a small-diameter pinion 15B of the driving gear 15.

A surrounding wall 36*c* protrudes from the plate 36*b* and a notch 36*d* is formed on the lower part of the wall. When the motor 11 is attached to the plate 36*a*, its worm 32, PI (photo-interrupter) blades 34, etc. described below protrude upward through notch 36*d*. The worm 32 has a spiral gear formed on its surface and engages with a large-diameter part 33*a* of the first reduction gear 33, on which is also formed a spiral gear. A small-diameter part 33*b* of the first reduction gear 33 engages with a large-diameter part 43*b* of the next gear, that is, the second reduction gear 43. The driving force that is transmitted from the motor 11 via said engagements is finally transmitted to the driving gear 15 via the engagement between a small-diameter part 43*a* of the second reduction gear 43 and a large-diameter part 15A of the driving gear 15.

Numeral 37 denotes a cover that covers the side of the motor unit M. A first plate 37*a* that comprises the main part of said cover has protruding a second plate 37*b* and a third plate 37*c*. The first plate 37*a* also has a notch 37*d*, to which a photo-interrupter (PI) 35 described below is attached. When this cover 37 is attached to the cabinet 36, the first plate 37*a* of the cover 37 becomes engaged with a wall 36*c* of the cabinet 36, and the second plate 37*b* and the third plate 37*c* of the cover 37 become engaged with the plate 36*b* of the cabinet 36, so that the blades of the photo-interrupter blades (hereinafter abbreviated as PI blades) 34 enter a gap 35*a* of the photo-interrupter 35.

Figure 14:
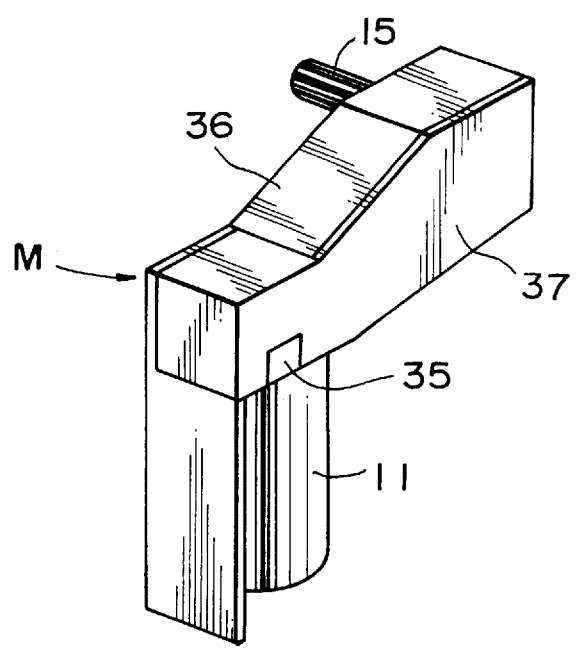
FIG. 14 is a simplified perspective view showing an external view of the motor unit when it is assembled.

In said drawing, when the worm 32 rotates by means of the driving of the motor 11, this rotation is sequentially transmitted to the reduction gears 33 and 43 and finally to the driving gear 15, which then rotates. At this time, the blades of the PI blades 34 that rotate as the motor 11 is driven continuously pass through the gap of the photo-interrupter (PI) 35, based on which the number of rotations of the motor 11 is counted via pulse counting. Incidentally, polyacetal resin, etc., is primarily used as the material for the worm 32, the reduction gears 33 and 43 and the driving gear 15. FIG. 14 is a perspective view showing the external view when the motor unit M is assembled. The motor unit M is incorporated into said interchangeable lens 61 in this assembled state.

Figure 15:
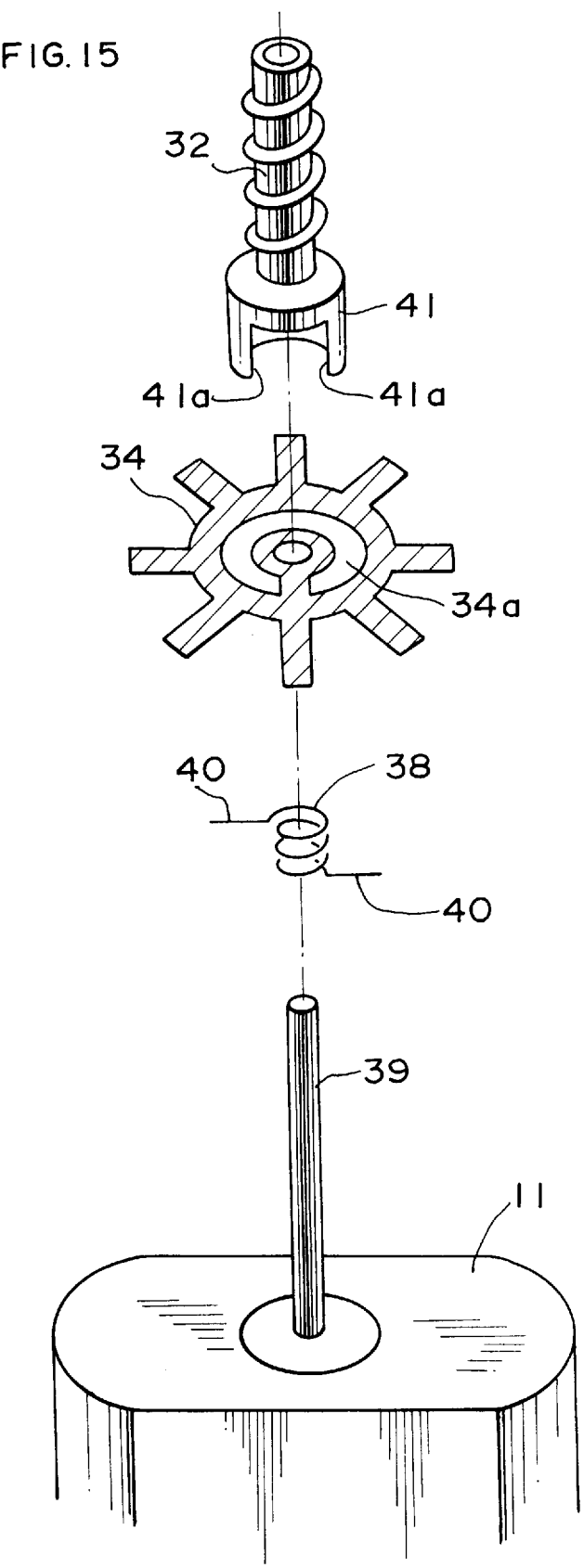
FIG. 15 is a perspective view showing the main components attached to the motor in a disassembled fashion.
Figure 16:
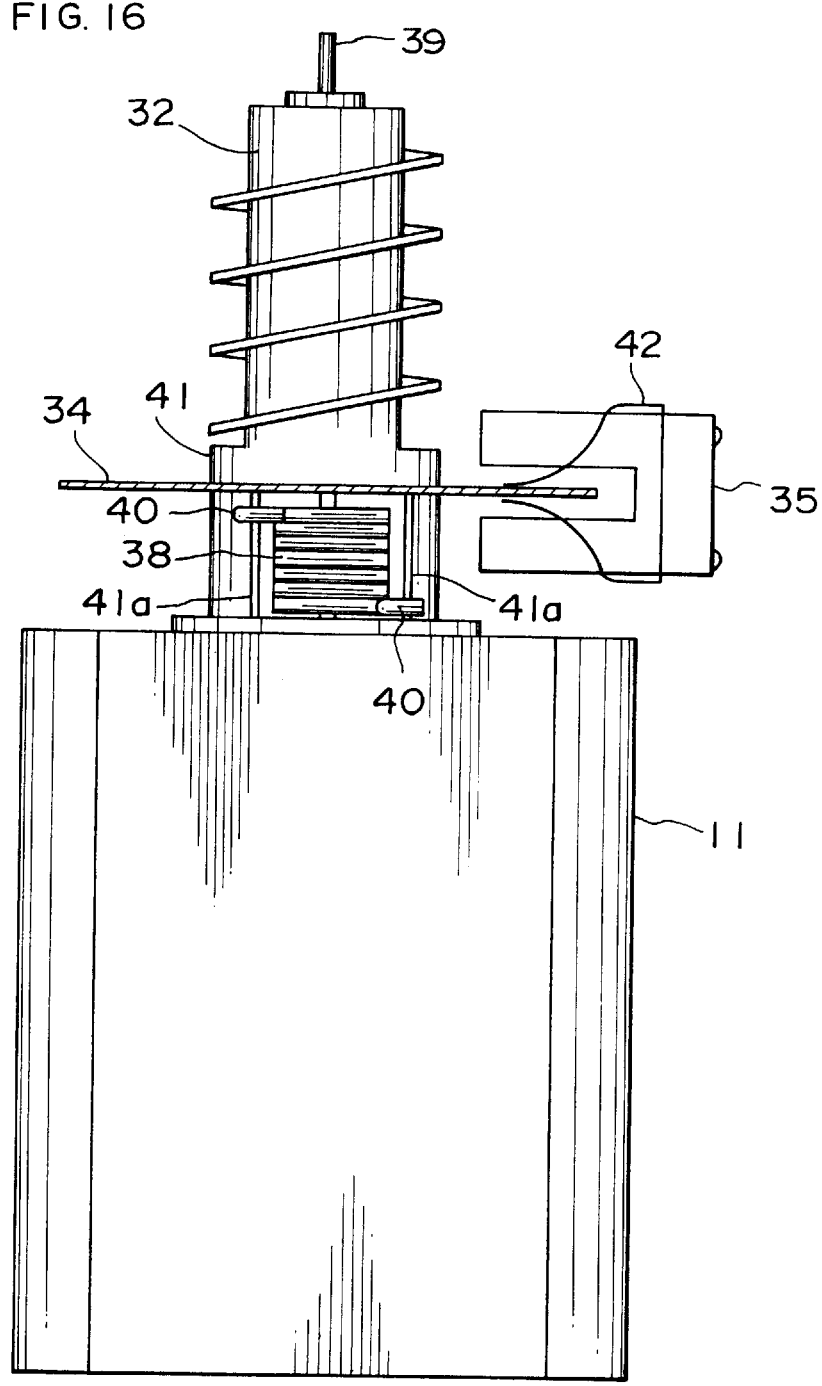
FIG. 16 is a drawing showing the main components attached to the motor when they are assembled.

FIG. 15 is a perspective view showing the main components that are attached to the motor 11, which are disassembled along the axis. FIG. 16 shows said components when they are assembled. As shown in these drawings, a torsion coil spring 38, which comprises a wire-like spring wound in a spiral fashion, wraps around a motor shaft 39 and is thus held based on friction, and the rotation of the motor shaft 39 is transmitted via a notch 41*a* of a skirt 41 that is located around the bottom of the worm 32 to the worm 32 by means of legs 40 that are located at either end of the torsion coil spring 38. When excess torque takes place due to the application of some external force to the worm 32, the torsion coil spring 38 slides around the motor shaft 39 in its direction of rotation, which prevents heating and burning of the motor 11.

The skirt 41 is inserted in a C-shaped hole 34*a* of the PI blades 34, and the motor shaft 39 passes through the centers of the PI blades 34 and the skirt 41. The rotation of the worm 32 is transmitted to the PI blades 34 with a prescribed angle of play due to the functions of the notch 41*a* formed on the skirt 41 and the C-shaped hole 34*a* formed on the PI blades 34, such that the reactive reverse rotation arising due to the elasticity, etc., of the components comprising the gear mechanism of the motor unit M described above may be absorbed and errors in the counting of the number of rotations of the motor 11 may be prevented. The details of this operation are provided below. In order to prevent the PI blades 34 from wobbling, a component such as a plate spring 42 is located on the photo-interrupter 35, for example, such that the PI blades 34 are supported from the top and bottom, as shown in FIG. 16.

Figure 17:
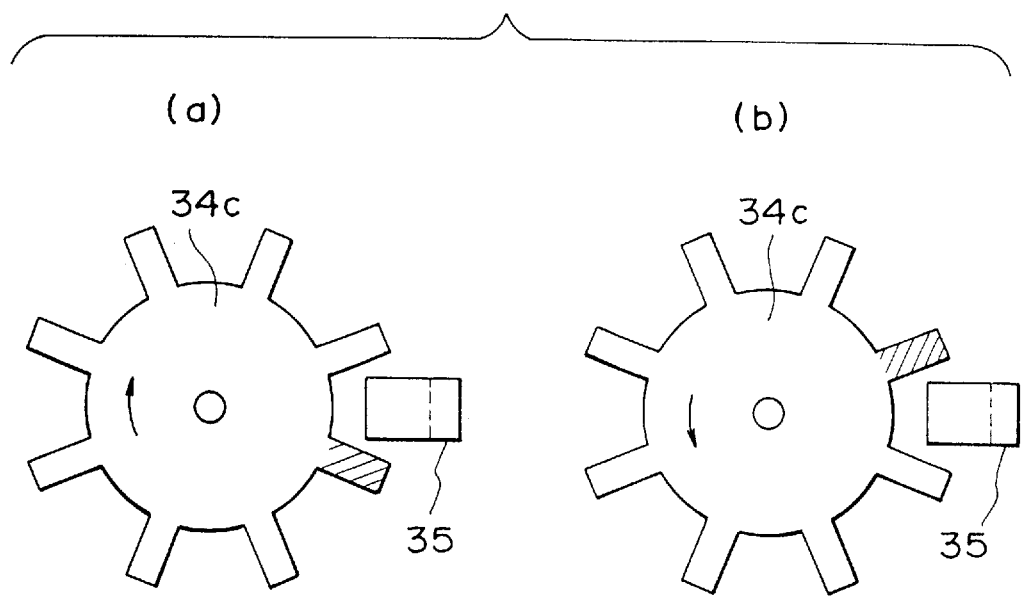
FIG. 17 is a drawing showing one example in which pulse counting is performed using the conventional construction.

FIG. 17 shows one example in which the number of rotations of the motor is counted via pulse counting using the conventional construction, said example being seen from the perspective of the motor shaft. In this case, because PI blades 34*c* are formed as a single integrated unit with worm 32, it rotates together with the rotation of motor shaft 39. Part (a) of said drawing shows in a simplified fashion PI blades 34*c* at the instant that they have stopped their clockwise rotation. The blade that has last passed the gap of photo-interrupter 35 is shaded, which goes backward due to the reactive reverse rotation and returns to the position shown in part (b) of said drawing. Since it passes the photo-interrupter 35 in the reverse direction, one pulse is added during counting despite the fact that the rotation occurred in the reverse direction. When the PI blades 34*c* continue to rotate clockwise, because the gear mechanism of motor unit M and the driven members such as lenses (not shown in the drawing) are driven after the PI blades 34*c* return to the state shown in part (a), i.e., a state before reactive reverse rotation occurs, another pulse is added during the counting.

Figure 18:
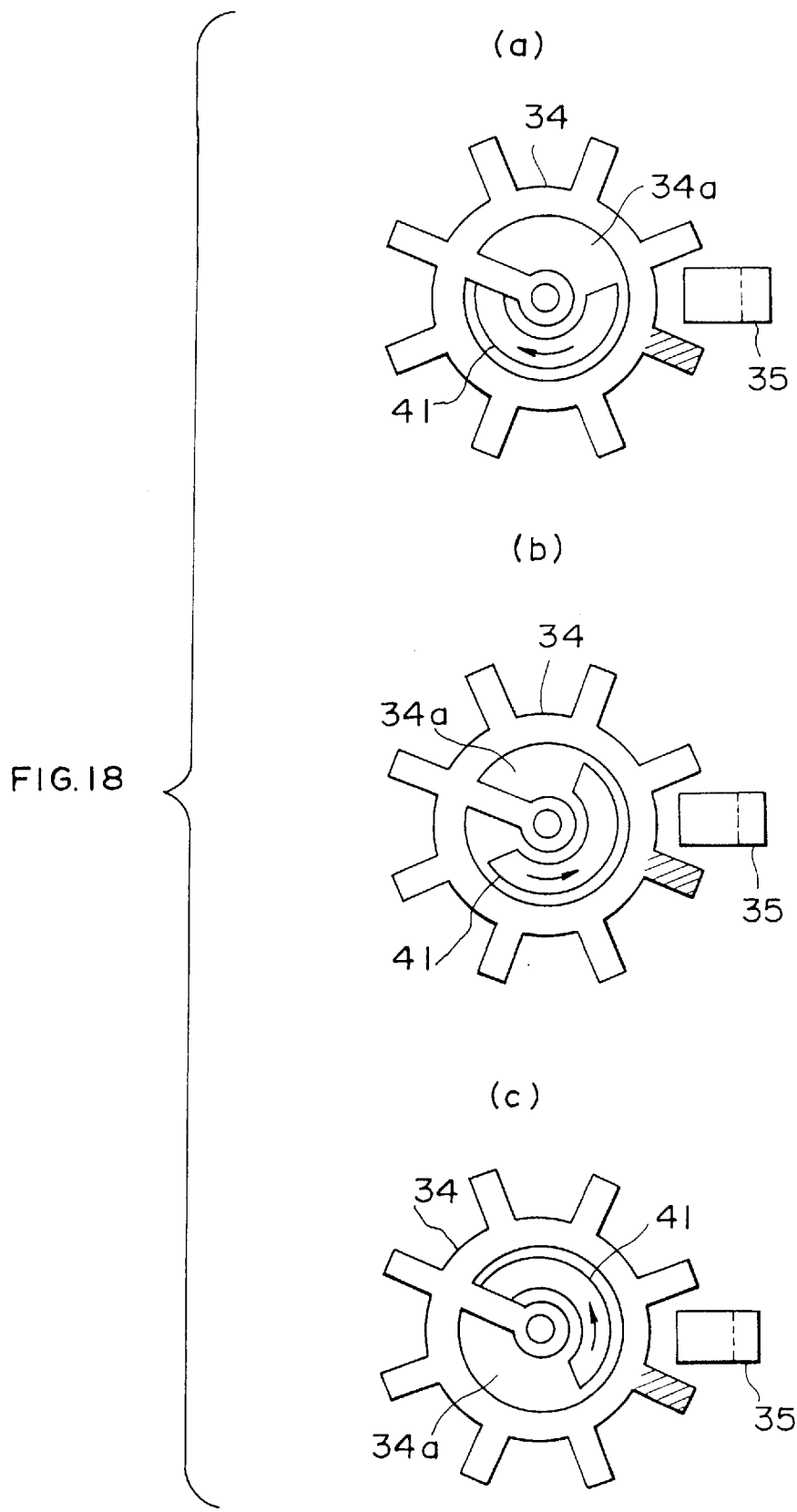
FIG. 18 is a drawing showing one example in which pulse counting is performed using the construction adopted in the present invention.

As described above, using the conventional mechanism, errors accumulate during counting each time rotation starts and stops. In the present invention, however, these errors may be prevented as a result of the mechanism that absorbs the reactive reverse rotation. FIG. 18, showing the PI blades 34 seen from the perspective of the motor shaft, shows the operation when the number of rotations of the motor 11 is counted via pulse counting in this embodiment. In this case, the rotation of the worm 32 is transmitted to the PI blades 34 with a prescribed angle of play due to the functions of the notch 41*a* formed on the skirt 41 of the worm 32 and the C-shaped hole 34*a* formed on the PI blades 34.

Part (a) of said drawing is a simplified drawing showing the skirt 41 of the worm 32 and the PI blades 34 at the instant that they have stopped their clockwise rotation. The blade that has last passed the gap of the photo-interrupter 35 is shaded. Due to the reactive reverse rotation, the state shown in part (b) of said drawing is entered and the skirt 41 returns, but the PI blades 34 remain where they stopped rotating. Consequently, the photo-interrupter 35 is not affected. When the skirt 41 continues to rotate clockwise, the PI blades 34, the gear mechanisms of the motor unit M and the driven members such as lenses (not shown in the drawing) are driven after the skirt 41 returns to the position shown in part (a) of said drawing before the reactive reverse rotation, accurate pulse counting is thus begun again.

Where the skirt 41 rotates counterclockwise, or in the reverse direction from the situation in part (b) of said drawing, the PI blades 34, the gear mechanism of the motor unit M and the driven members such as lenses (not shown in the drawing) are driven after the skirt 41 reaches the position shown in part (c) of said drawing. In this case, the number of pulses that are not counted due to the movement of the skirt 41 and the PI blades 34 (three pulses in this example) within a prescribed angle of play should be registered in advance and added to the counting during reverse rotation. Accurate pulse counting may be carried out in this way.

Where lens mounts such as interchangeable lenses are concerned, focusing cannot be performed unless the lenses are accurately driven during auto-focusing. Since counting errors arising from pulses caused by reactive reverse rotation may be prevented by applying the present invention, lenses may be accurately driven in a lens mount.

Figure 11:
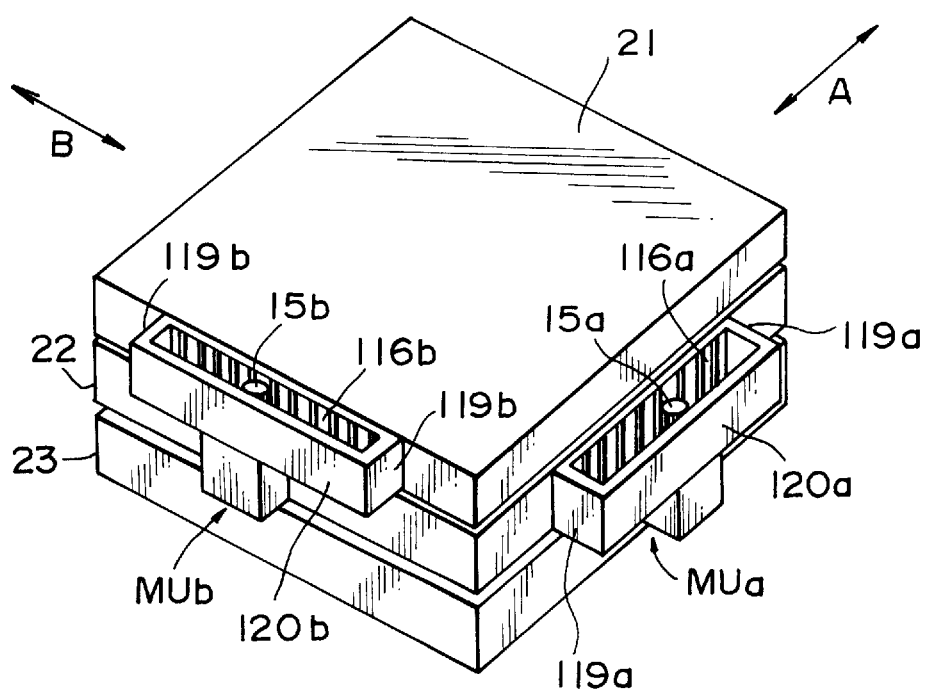
FIG. 11 is a simplified drawing showing an X-Y table, a second embodiment of the present invention.

FIG. 11 is a simplified drawing showing, as a second embodiment of the present invention, an X-Y table in which the construction explained above is applied not in a rotating mechanism but in a straight-advancing mechanism. In this drawing, a motor unit MUa is attached to one side of a fixed table 23 that works as the base for this X-Y table. This motor unit MUa has a built-in motor, and a driving gear 15a that rotates by means of said motor protrudes from the motor unit MUa. A rack gear 116a is attached to one side of a moving table 22 that is attached to the top of the fixed table 23 such that it may slide in the directions shown by arrows A that are parallel to said surface. When the driving gear 15a is driven by means of the motor unit MUa, this rack gear 116a becomes engaged with the driving gear 15a and is driven such that the moving table 22 moves in the directions indicated by arrows A relative to the fixed table 23.

In addition, another motor unit MUb is attached to a side of the moving table 22 that is perpendicular to the side to which the rack gear 116a is attached. In the same manner as described above, this motor unit Mub has a built-in motor, and a driving gear 15b that rotates by means of said motor protrudes from the motor unit MUb. Another rack gear 116b is attached to a side of a moving table 21 that is attached to the top of the moving table 22 such that it may be parallel to said surface and may slide in the directions indicated by arrows B that are perpendicular to the directions indicated by arrows A. When the driving gear 15b is driven by the motor unit MUb, the rack gear 116b becomes engaged with the driving gear 15b and is driven such that the moving table 21 moves in the directions indicated by arrows B relative to the moving table 22.

Figure 12:
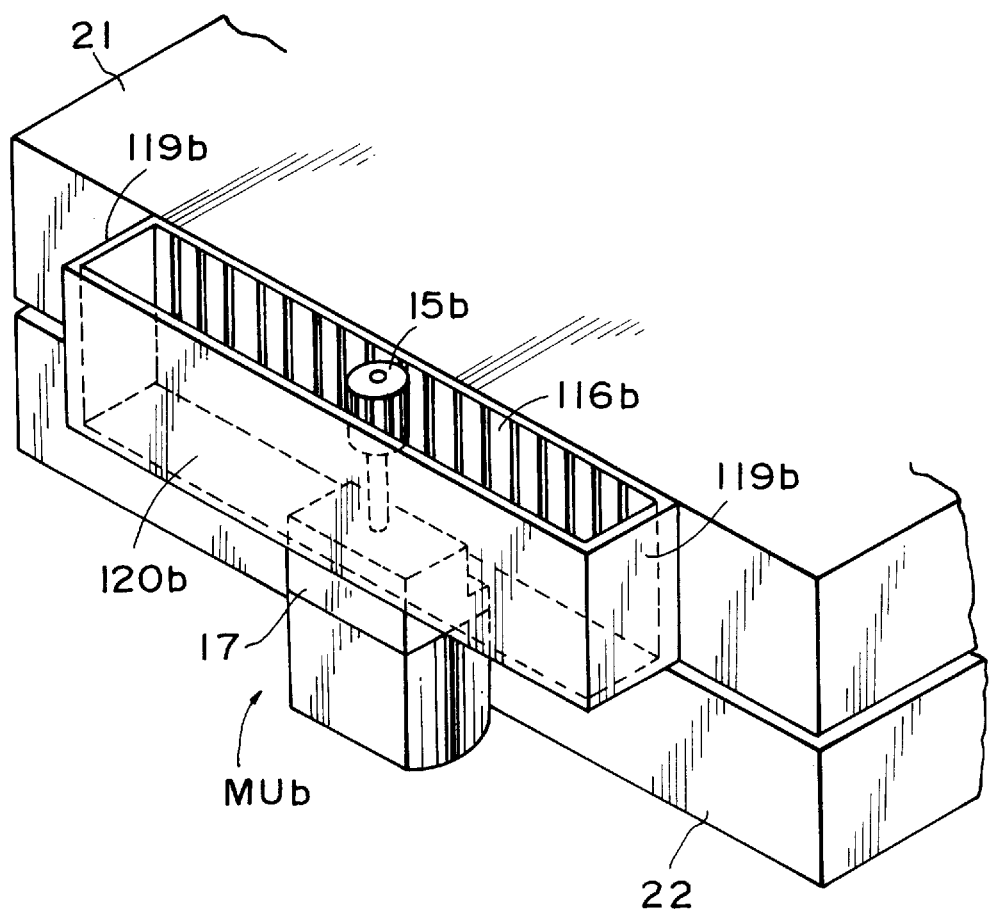
FIG. 12 is a simplified drawing showing the details of the mechanisms of the X-Y table.

FIG. 12 shows the details of the driving mechanism of the X-Y table described above. In this drawing, a bearing 17 that extends from the motor unit MUb attached to one side of the moving table 22 operates to stop the movement of the rack gear 116b and that of the moving table 21 by coming into contact with one of stoppers 119b that are located at either end of the rack gear 116b located on one side of the moving table 21. Numeral 120b denotes a sliding member that bridges the stoppers 119b. It comes into contact with the bearing 17 when the driving gear 15b is lifted, and prevents the driving gear 15b from escaping.

The identical situation arises when a bearing 17 (not shown in FIG. 11) that extends from the motor unit MUa attached to one side of the fixed table 23 shown in FIG. 11 comes into contact with one of stoppers 119a that are located at either end of the rack gear 116a located on one side of the moving table 22, and when a sliding member 120a that bridges the stoppers 119a comes into contact with the bearing 17 when the driving gear 15a driven by the motor unit MUa is lifted.

The details of the motor unit are the same as those shown in FIGS. 13 through 16. The positioning of an X-Y table must be accurately controlled when a sample is placed on it for the purpose of observation or processing. Because erroneous pulses caused by reactive reverse rotation may be prevented by applying the present invention, accurate positioning control of an X-Y table becomes possible.

The embodiments described above involved an interchangeable lens and X-Y table in which the present invention was applied, but its application is not limited to these. The present invention may be employed in any device that is driven to rotate, advance straight ahead, or move in various other ways.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus comprising:
   a movable device which is to be moved;
   a power source having a rotational axis which outputs the driving force of said power source so as to move said movable device, said rotational axis includes an interlocking portion;
   a rotational plate which interlocks with said interlocking portion so as to rotate together with said rotation axis; and
   a detector which finds the rotational amount of said rotational axis by detecting the rotation amount of said rotational plate,
   wherein there exists a play between said rotational plate and said interlocking portion in the rotational direction so as to mutually interlock at one end of the range of the play.

2. An apparatus as defined in claim 1, wherein said interlocking portion is separable from said rotational axis.

3. An apparatus as defined in claim 2, wherein said interlocking portion is frictionally connected with said rotational axis.

4. An apparatus as defined in claim 2 further comprising a spring which is frictionally twined around said rotational axis and the both ends of the spring are resiliently engaged with said interlocking portion.

5. An apparatus as defined in claim 1, wherein said rotational plate has a C-shaped hole and said interlocking portion is loosely fitted in said hole.

6. An apparatus as defined in claim 5, wherein said interlocking portion and said rotational plate interlock at one end of said C-shaped hole.

7. An apparatus as defined in claim 6, wherein said interlocking portion and said rotational plate interlock at both ends of said C-shaped hole.

8. An apparatus as defined in claim 1, wherein said interlocking portion and said rotational plate interlock at both ends of the range of the play.

9. An apparatus as defined in claim 1, wherein said apparatus is a taking lens of a camera.

10. An apparatus as defined in claim 1, wherein said rotational plate is provided with a plurality of blades extending along radial directions, and said detector detects the rotational amount of said rotational axis by counting the movement of said blades.

11. A rotation device comprising:
    a rotational axis which includes an interlocking portion;
    a rotational plate which interlocks with said interlocking portion so as to rotate together with said rotation axis; and
    a detector which finds the rotational amount of said rotational axis by detecting the rotational amount of said rotational plate, wherein there exists a play between said rotational plate and said interlocking portion in the rotational direction so as to mutually interlock at one end of the range of the play.

12. A device as defined in claim 11, wherein said interlocking portion is separable from said rotational axis.

13. A device as defined in claim 12, wherein said interlocking portion is frictionally connected with said rotational axis.

14. A device as defined in claim 12 further comprising a spring which is frictionally twined around said rotational axis and the both ends of the spring are resiliently engaged with said interlocking portion.

15. A device as defined in claim 11, wherein said rotational plate has a C-shaped hole and said interlocking portion is loosely fitted in said hole.

16. A device as defined in claim 15, wherein said interlocking portion and said rotational plate interlock at one end of said C-shaped hole.

17. A device as defined in claim 16, wherein said interlocking portion and said rotational plate interlock at both ends of said C-shaped hole.

18. A device as defined in claim 11, wherein said said interlocking portion and said rotational plate interlock at both ends of the range of the play.

19. An apparatus comprising:
a movable device which is to be moved;
a power source;
a rotational member which outputs a driving force of said power source so as to move said movable device, said rotational member includes an interlocking portion;
torsional means transmitting the driving force of said power source to said rotational member and absorbing external torque applied to the rotational member such that the external torque is not transmitted to said power source
a rotational plate which interlocks with said interlocking portion so as to rotate together with said rotational member; and
a detector which finds the amount of rotation of said rotational member by detecting the amount of rotation of said rotational plate,
wherein there exists a range of play between said rotational plate and said interlocking portion in the rotational direction so as to mutually interlock said rotational plate and said rotational member for rotation together at one end of the range of the play.

20. The apparatus of claim 19, wherein said torsional means comprises a spring.

21. The apparatus of claim 19, wherein said rotational plate includes a non-circular hole that cooperates with said interlocking portion.

* * * * *